Figure 1:
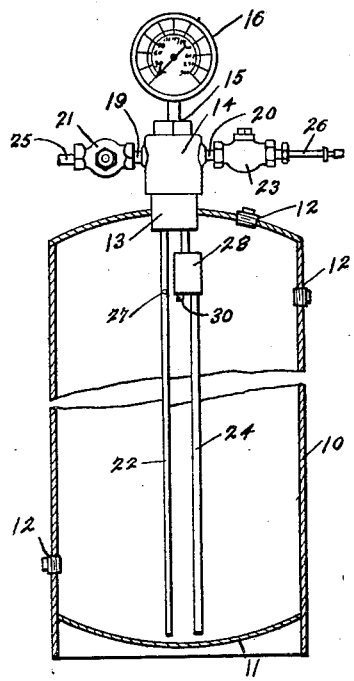

May 2, 1933.  F. A. NASON ET AL  1,907,085

VALVE MECHANISM

Filed Nov. 5, 1928  2 Sheets-Sheet 1

INVENTOR.
Francis A. Nason and
Fred W. Winnen
BY

Ray Oberlin & Fay
ATTORNEYS

INVENTOR.
Francis A Nason and
Fred W. Winnen
BY
ATTORNEYS

Patented May 2, 1933

1,907,085

UNITED STATES PATENT OFFICE

FRANCIS A. NASON, OF EAST CLEVELAND, AND FRED W. WINNEN, OF CLEVELAND, OHIO, ASSIGNORS TO THE LUBRI-GRAPH CORPORATION, A CORPORATION OF OHIO

VALVE MECHANISM

Application filed November 5, 1928. Serial No. 317,424.

The present invention, relating, as indicated, to spray lubricating apparatus, has more particular reference to the lubricant containing and expelling parts of such an apparatus, and its primary object is to provide a valve organization which on the one hand functions in such a manner as to insure positive agitation of the oil and graphite mixture confined in the containing reservoir and which on the other hand functions in such a manner as to prevent this mixture from being reversely forced through the compressed air induction tube.

More specifically, our invention consists of a containing reservoir which is formed with a concave or downwardly bulged collecting bottom, and a head which is adapted to removably engage with the neck portion of such reservoir; this head including a lubricant outlet pipe in association with a flow controlling valve and an atomizing air inlet port, and an air induction pipe in association with an exteriorly positioned main check valve and an interiorly positioned valve body, such valve body having an inwardly movable valve which automatically opens to permit some of the confined air to escape when such main check valve becomes ineffective to completely prevent such escape and a second valve which operates in conjunction with such first valve and which is effective to seal the air inlet tube and thus supplementally prevent upward motion of the lubricant through such obstructing valve and through such air inlet valve. These valves are, however, effective in the above explained manner only when an undesired leakage of the confined expelling air occurs; as when such expelling air is being charged into the lubricant container, the former valve is closed by the pressure and then acts to compel a continued downward flow of the entering air, while the latter valve in one embodiment of our invention remains in an unseated and non-obstructing position and in another embodiment is positively unseated or removed from its lubricant obstructing position to a second position where it functions to prevent any escape of air through a normally open passageway in communication with the container's air entrapping space and thus constrains such air to continue its downward direction of flow until released in agitating relation to the collecting bottom for the purpose of stirring and mixing the lubricant constituents as it escapes from the induction tube and bubbles upwardly into its confining space in the extreme upper part of the reservoir.

To the accomplishment of the foregoing and related ends, said invention, then, consists of the means hereinafter fully described and particularly pointed out in the claims; the annexed drawings and the following description setting forth in detail certain structure embodying the invention, such disclosed means constituting, however, but one of various mechanical forms in which the principle of the invention may be used.

In said annexed drawings:—

Figure 3:
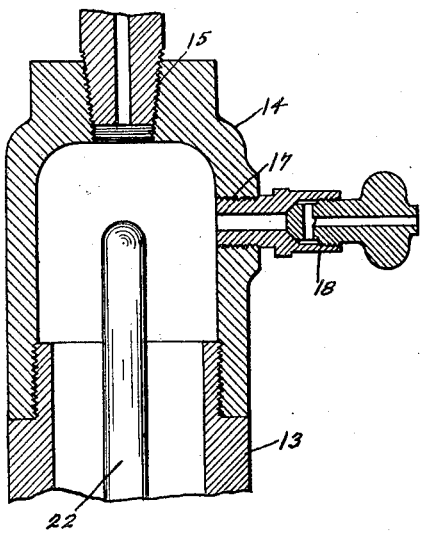
Figure 2:
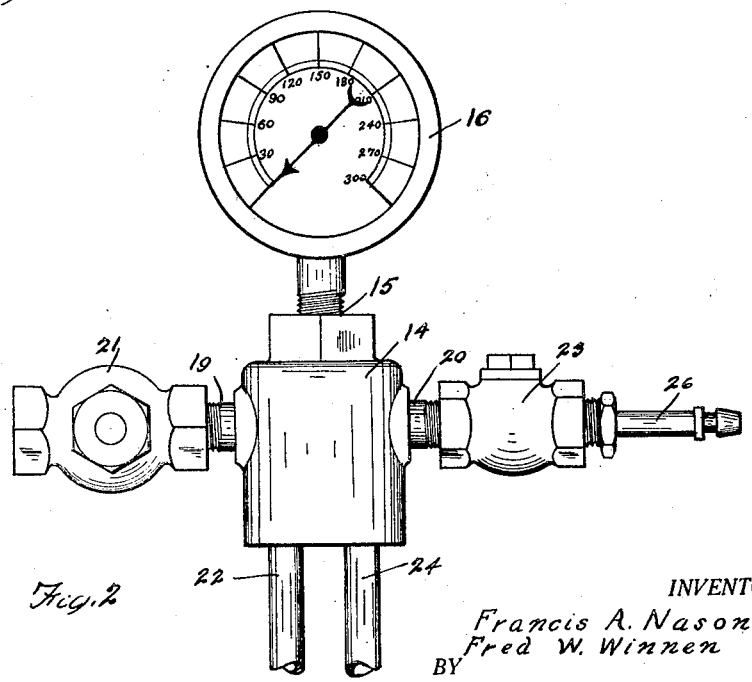
Figure 4:
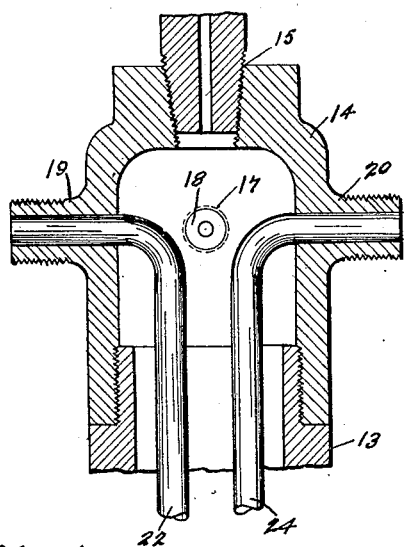
Figure 5:
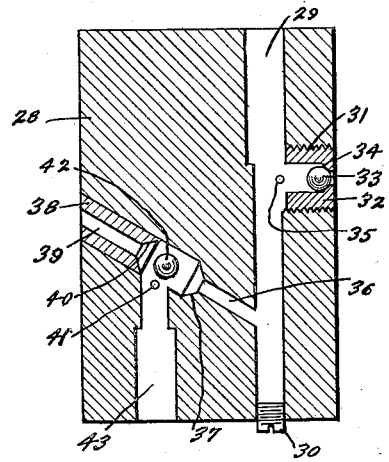
Figure 6:
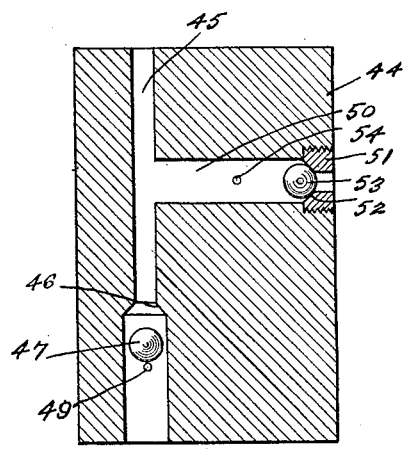
Figure 7:
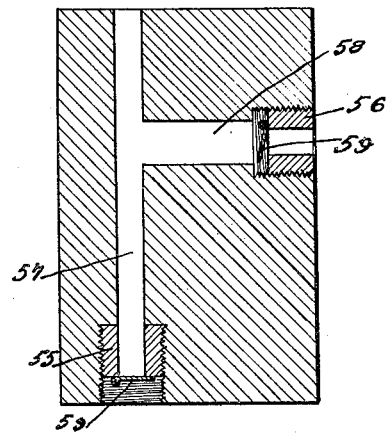
Figure 8:
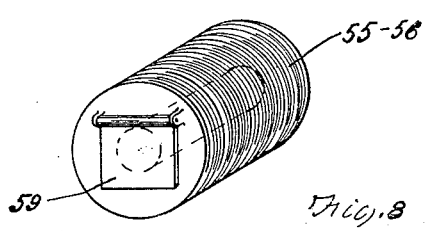

Fig. 1 is a partly sectional and partly elevational view of a lubricating apparatus embodying the present improvements; Fig. 2 is an enlarged and fragmentary front elevational view of the upper part of the apparatus shown in Fig. 1; Fig. 3 is a fragmentary vertical section through the head shown in Figs. 1 and 2; Fig. 4 is a vertical section which was taken at right angles to the section of Fig. 3; Fig. 5 is a vertical sectional view through the valve body shown in Fig. 1; Fig. 6 is a vertical section through a modified valve body of the general type shown in Figs. 1 and 5; Fig. 7 is a vertical sectional view through a further modified form of the valve body shown in Fig. 6; and Fig. 8 is a perspective view of one of the valve plugs shown in Fig. 7.

For the purposes of illustration, our invention is here shown in association with a container 10 which is preferably provided with a concave or downwardly bulged bottom 11, a plurality of screw plug closed openings 12, and an externally threaded neck 13. In threaded engagement with such neck 13 is a removable head 14 which has a threaded top opening 15 for receiving a similarly threaded tube in communication with the pressure gauge 16, and a threaded side opening 17 for receiving a vent valve 18, such valve being operable to release the compressed air which is normally employed for expelling lubricant from the container 10. This head is further provided with two lateral extensions 19 and 20, the former threadably engaging with a suitable cut-off valve 21 and having a bore for fixedly receiving the upper end of an outlet or expulsion tube 22, and the latter threadedly engaging with an inwardly opening check valve 23 and having a bore for fixedly receiving the upper end of an inlet or induction tube 24. For the purpose of connecting with one end of a rubber or like tube which conducts lubricant from the outlet tube 22 to a suitable nozzle or spraying apparatus (not shown), the cut-off valve 21 is provided with a nipple or coupling piece 25, and for the purpose of connecting with a compressed air line for charging the container 10, the check valve 23 is provided with a coupling piece 26.

As clearly shown in Fig. 1, the outlet pipe 22 extends to a point only slightly above the bottom 11 of the container 10 and has an inlet port 27, while the inlet pipe 24 extends to approximately the same level and connects with a valve body 28. Such body, as best shown in Fig. 5, has a longitudinal bore 29 which at one end is adapted for receiving the lower end of the upper section of the induction tube 24 and which at its other end is closed by a removable plug 30. In communication with the bore 29 is an opening 31 which threadably retains a valve unit 32, such unit being provided with an inwardly movable ball 33 and a seat 34. A transverse rod 35 serves to prevent the ball 33 from moving beyond the inner end of the unit 32. Extending upwardly at an angle of say 60° from the lower part of the bore 29 is a passageway 36 which is formed with a seat 37 and which is adapted for removably retaining a sleeve 38, such sleeve having a bore 39 and presenting a second seat 40 in alignment with the seat 37. Between the seats 37 and 40 and retained against downward movement by a transverse rod 41 is a ball 42 which is movable into sealing relation with either of such seats under the conditions hereinafter described. Opening into the passageway 36 and having a lower end adapted for fixedly receiving the upper end of the lower section of the inlet tube 24 is a bore 43.

In Fig. 6, a modified valve body 44 is shown. Such body is provided with a longitudinal bore 45 which is formed with a seat 46, and whose upper and lower ends are adapted for receiving the respective lower and upper ends of the inlet pipe sections. A ball 47 is arranged for coacting with the seat 46 and is normally held in a downwardly spaced relation to such seat by means of a transverse pin 49. A passageway 50 opens into the bore 45 and at its outer end threadably retains a valve unit 51, such unit having a seat 52 for coacting with the inwardly movable ball 53. The inward movement of such ball is limited by a transverse pin 54. The valve body illustrated in Fig. 7 is in general the same as the valve body illustrated in Fig. 6, but in place of the ball valves shown in such Fig. 6, this valve body is provided with the modified valve assemblies 55 and 56. The valve assembly 55 threadably engages with the lower part of the longitudinal bore 57, and the valve assembly 56 similarly engages with the passageway 58. Each of such assemblies is formed with a seat on one of its ends and each is provided with a hingedly mounted flap valve 59, the hinge or pivot of the assembly 56 preferably having the uppermost position illustrated when such assembly is engaged with the passageway 58, and the assembly 55 being preferably so arranged with relation to the adjacent end of the lower section of the inlet tube that its flap valve 59 is prevented from assuming such a position as would interfere with its seating upon an upward movement of lubricant through the inlet tube.

When equipped with a valve body of either of the types illustrated in Figs. 6 and 7, the apparatus above described operates as follows: The upper of the normally plugged holes 12 in the container 10 is opened, and the graphite and oil mixture is then poured into such container and the plug closure replaced. The coupling piece 26 is now connected with a compressed air line and the container 10 thereby charged to a suitable pressure, the air in entering passing downwardly through the tube 24 and then bubbling upwardly through the lubricant and accumulating in the space thereabove. Positive agitation of such lubricant is insured by the concave collecting bottom of the container and by the outward pressure effected seating of the valves 53 or 59. When the valve 21 is opened, the pressure within the container 10 will force lubricant out through the tube 22, a small amount of air entering through the port 27 and commingling with such lubricant for atomizing it when escaping through the outlet or spraying nozzle. In event of leakage of the check valve 23, it is apparent that air will escape past the ball 53 or the flap 59 and that if such leakage is of considerable volume that the ball 47 or the corresponding flap 59 will close to prevent reverse flow of lubricant through the air inlet tube. When our lubricating apparatus is equipped with a valve body of the sort illustrated in Fig. 5, the filling operation is conducted in the manner above explained, but when the compressed air is being introduced into the container the action is some different. As before, the entering air acts to close the side valve by moving the ball 33 against its seat 34, but then such air, instead of passing unobstructedly into the lower section of the inlet tube as in the valve bodies previously described, acts to unseat the ball 42 from the seat 37 and then continues on into the lower section. When such charging is discontinued, the ball 42 resumes its seat 37 and in so doing of course leaves the seat 40, it having been held in contact with such latter seat by the current of entering air. In this embodiment, however, if the check valve 23 leaks, it is apparent that air will pass inwardly around the ball 33 and that reverse movement of the lubricant through the air inlet tube will be prevented by the seal formed between the ball 42 and the seat 37.

It will be understood that ordinarily and when a spray expulsion of the lubricant is desired, the top surface of such lubricant will be below the valve body and below the port 27. If desired, flap valves similar to those shown in Fig. 7 may be employed in the valve body of Fig. 5, and as above stated such valves are so arranged as to prevent their reverse movement away from instead of towards their seats upon occurrence of a fluid flow in the direction of such seats. It will also be understood that such valves, whether of the exact type and form shown or not, are provided for the purpose of insuring agitation and mixing of the lubricant components by the entering charging air, and for preventing the lubricant mixture from flowing outwardly through the air inlet tube upon occurrence of such leakage as would give the confined expelling air a pressure advantage.

Other modes of applying the principle of our invention may be employed instead of the one explained, change being made as regards the structure herein disclosed, provided the means stated by any of the following claims or the equivalent of such stated means be employed.

We therefore particularly point out and distinctly claim as our invention:—

1. In apparatus of the class described, an inlet tube having a branch tube in communication therewith, a valve movable to selectively seal either said inlet tube or said branch tube according as the pressure within such inlet tube is less or greater than the pressure without such inlet tube, and a second valve in an aperture in the wall of said inlet tube movable to selectively open and seal such aperture according as the pressure within such inlet tube is less or greater than the pressure without such inlet tube.

2. In apparatus of the class described, an air inlet tube having a branch tube in communication therewith, a valve movable to selectively seal either said inlet tube or said branch tube, said branch tube being adapted to admit air to force said valve into position to seal said inlet tube when the pressure within such inlet tube is less than the pressure without such inlet tube, and a second valve in an aperture in the wall of said inlet tube movable to selectively open and seal such aperture according as the pressure within such inlet tube is less or greater than the pressure without such inlet tube.

3. In apparatus of the class described, a valve body having two substantially vertical bores, one of said bores open at the top of said body and the other open at the bottom thereof, a branch tube in said body open at one end and in communication with said vertical bores, oppositely disposed valve seats in said branch tube, and a movable valve member positioned intermediately of said seats adapted to contact with either of said seats.

4. In apparatus of the class described, a valve body having two substantially vertical bores, one of said bores open at the top of said body and the other open at the bottom thereof, a branch tube in said body open at one end and in communication with said vertical bores, oppositely disposed valve seats in said branch tube, one of said bores opening into said tube intermediately of said seats, and a movable valve member positioned intermediately of said seats adapted to contact with either of said seats.

5. In apparatus of the class described, a valve body having two substantially vertical bores, one of said bores open at the top of said body and the other open at the bottom thereof, a branch tube in said body open at one end and in communication with said vertical bores, oppositely disposed valve seats in said branch tube, one of said bores opening into said tube intermediately of said seats, a movable valve member positioned intermediately of said seats adapted to contact with either of said seats, and means for preventing said valve member from sealing said bore.

6. In apparatus of the class described, a valve body having two substantially vertical bores, one of said bores open at the top of said body and the other open at the bottom thereof, a branch tube in said body open at one end and in communication with said vertical bores, oppositely disposed valve seats in said branch tube, said last named bore opening into said tube intermediately of said seats, and a movable valve member positioned intermediately of said seats adapted to contact with either of said seats.

7. In apparatus of the class described, a valve body having two substantially vertical bores, one of said bores open at the top of said body and the other open at the bottom thereof; a branch tube inclined with the vertical, in communication with said bores and opening out of said body; oppositely disposed valve seats in said branch tube; and a movable valve member positioned intermediately of said seats adapted to contact with either of said seats.

8. In apparatus of the class described, a valve body having two substantially vertical bores, one of said bores open at the top of said body and the other open at the bottom thereof; a branch tube inclined with the vertical, in communication with said bores and opening out of said body; oppositely disposed valve seats in said branch tube on opposite sides of one of said bores; and a movable valve member positioned intermediately of said seats adapted to contact with either of said seats.

9. In apparatus of the class described, a valve body having two substantially vertical bores, one of said bores open at the top of said body and the other open at the bottom thereof; a branch tube inclined with the vertical, in communication with said bores and opening out of said body; oppositely disposed valve seats in said branch tube on opposite sides of said last named bore; a movable valve member positioned intermediately of said seats adapted to contact with either of said seats, and means preventing said valve from sealing said last named bore.

10. In apparatus of the class described, a valve body having two bores, one of said bores entering from one side of said body and the other bore entering from another side; an aperture leading from said first named bore out of said body; a check valve in said aperture; a branch bore entering said body and in communication with said first named bores; oppositely disposed valve seats in said branch bore; and a movable valve member positioned intermediately of said valve seats adapted to contact with either one thereof.

11. In apparatus of the class described, a valve body having two bores, one of said bores entering from one side of said body and the other bore entering from another side; an aperture leading from said first named bore out of said body; a check valve in said aperture; a branch bore entering said body and in communication with said first named bores; oppositely disposed valve seats in said branch bore on opposite sides of one of said first named bores; and a movable valve member positioned intermediately of said valve seats and adapted to contact with either one thereof.

12. In apparatus of the character described, a valve body having connected inlet and outlet bores, a branch bore extending therefrom out of said body, and a valve member arranged so that at all times force of gravity thereon tends to close said inlet bore but movable to selectively seal either said inlet or said branch bore according as the pressure within such inlet bore is less or greater than the pressure around said valve body.

Signed by us, this 29th day of October, 1928.

FRANCIS A. NASON.
FRED W. WINNEN.